United States Patent [11] 3,552,496

[72] Inventor Everett J. Tasset
c/o American Products, Inc., Spearville, Kans. 67876
[21] Appl. No. 725,565
[22] Filed Jan. 5, 1971
[45] Patented Dec. 29, 1970
Continuation-in-part of application Ser. No. 658,805, Aug. 7, 1967, now abandoned.

[54] ROD WEEDER
2 Claims, 8 Drawing Figs.
[52] U.S. Cl. ..................................................... 172/44,
172/125, 172/106
[51] Int. Cl. ....................................................... A01b 39/19
[50] Field of Search ............................................ 172/44,
708, 548, 125, 106; 74/230.6

[56] References Cited
UNITED STATES PATENTS
| 1,719,292 | 7/1929 | Fulk et al. | 172/548 |
| 1,914,731 | 6/1933 | Stewart | 172/708X |
| 2,168,515 | 8/1939 | Davies | 74/230.6X |
| 2,379,781 | 7/1945 | Blaydes | 172/44 |
| 2,920,706 | 1/1960 | Turner | 172/44 |
| 3,033,294 | 5/1962 | Edwards | 172/44 |
| 3,186,494 | 6/1965 | Jackson | 172/44 |

FOREIGN PATENTS
| 469,320 | 11/1950 | Canada | 172/44 |
| 739,199 | 7/1966 | Canada | 172/44 |

Primary Examiner—Robert E. Bagwill
Assistant Examiner—Alan E. Kopecki
Attorney—John H. Widdowson ABSTRACT: A rod weeder is mounted for operation preferably on and carried by an earth working implement, such as a spring tooth harrow. In a preferred embodiment, drive means is provided having two pulley wheels and a criss-cross belt trained over the pulley wheels thereby rotating the rod weeder in a direction opposite the direction of rotation of the wheels of the implement as it is towed along underneath the ground. The housing for the drive is provided with two parallel sides maintained in a spaced relation and an upper plate. The pulley wheels are provided with a plurality of apertures positioned within the side surfaces of the pulley wheels which provides a cleaning effect for the pulley wheels thereby preventing soil and/or weed from interferring with the drive mechanism.

In another preferred embodiment, a drive means is provided having three sprocket wheel means and an endless chain member. The chain member is trained over the two extreme sprocket wheel means and positioned below and adjacent a third sprocket wheel means which is intermediate said first and second sprocket wheel means. The third sprocket wheel means is secured to the axle of the drive wheel and upon movement of the drive wheel the third sprocket wheel and the chain member rotate the first and second sprocket wheel means and turn the rod weeder in a clockwise direction. The first and second sprocket wheel means are provided with a plurality of apertures positioned within the side surface thereof which provides a cleaning effect and prevents soil and/or weeds from clogging the drive mechanism.

PATENTED JAN 5 1971

INVENTOR.
EVERETT J. TASSET

BY *John H. Widdowson*
*Glen M. Burdick*
ATTORNEYS

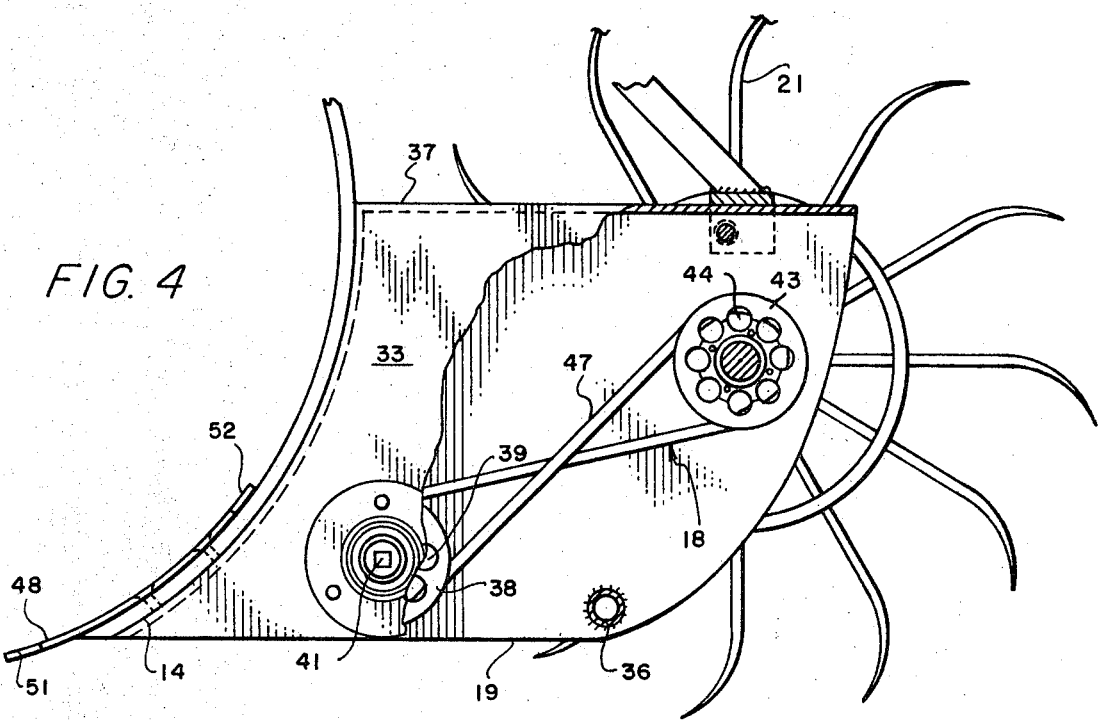
FIG. 4
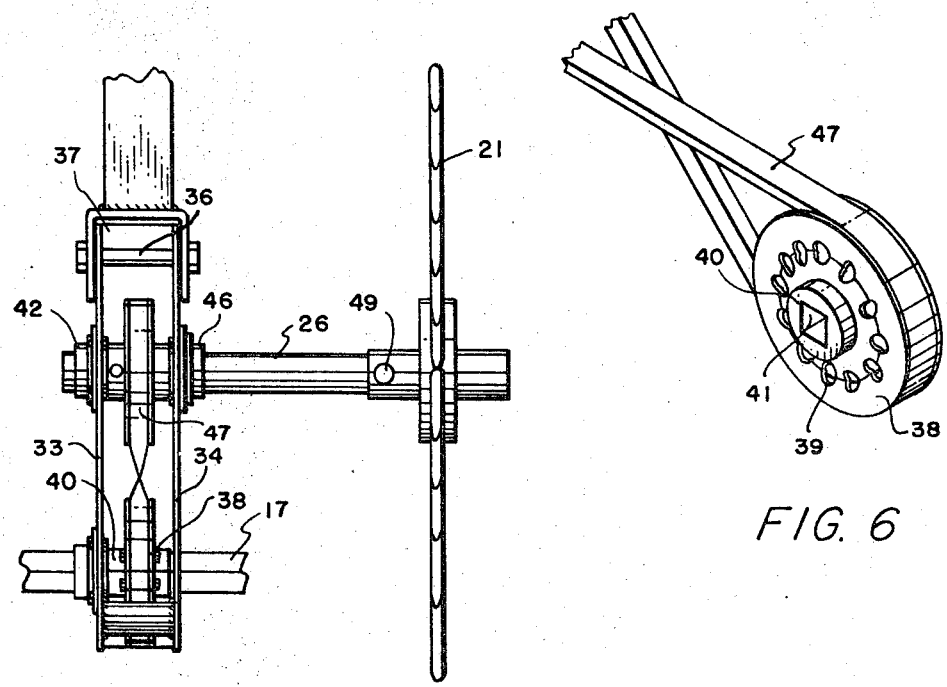
FIG. 5
FIG. 6
INVENTOR.
EVERETT J. TASSET
BY John H. Wilkinson
Glen M. Burdick
ATTORNEYS

PATENTED JAN 5 1971

INVENTOR.
EVERETT J. TASSET
BY
*John H. Wildmon*
*Glen M. Burdick*
ATTORNEYS

ROD WEEDER

This application is a continuation-in-part of applicant's Ser. No. 658,805, filed on Aug. 7, 1967, now abandoned.

This invention relates to agricultural equipment. In one aspect it relates to an apparatus for removing undesirable growth from the field. In another aspect it relates to a rotary rod weeder means adapted to be towed or hauled by a tractor and the like for uprooting and thus destroying undesirable growth from a field. In another aspect it relates to the combination of an earth turning device employed in conjunction with said rotary rod weeder means. In still another aspect it relates to a drive means and a drive-housing means for said rotary rod weeder means, said drive means being adapted to operate in a self-cleaning manner thereby preventing dirt and/or weeds from interfering with the drive means.

Rod weeders have been employed to rid unseeded land from weeds thereby preventing the weeds from deteriorating the soil by growth of the weeds. However, problems have been encountered by the prior art means in that as the rod weeder is pulled through the field underneath the ground the drive means becomes clogged by dirt and/or weeds thereby causing frequent shutdowns of the equipment and therefore a waste of time in order to clean the drive mechanism so that the work can be continued.

According to the present invention I have found that by positioning a pair of pulley wheels within a drive housing and training a crisscross belt over the pulley wheels that the rotary weeder bar can be caused to operate in a clockwise direction thereby lifting the weeds from the soil and laying them on the surface.

Further, I have found that by positioning three sprocket wheels within a drive housing and training an endless chain member over the two extreme sprocket wheels and underneath and adjacent the lower surface portion of an intermediate drive sprocket wheel that the rotary weeder bar can be rotated in a clockwise direction thereby lifting the weeds from the soil and laying them on the surface.

Further, I have found that by providing a plurality of apertures within the side surfaces of the pulley wheels and three extreme sprocket wheels having the endless chain member entrained thereover the pulley wheels and extreme sprocket wheels are provided with a self-cleaning action thereby preventing clogging by dirt and/or weeds of the drive mechanism.

An object of my invention is to provide an apparatus for removing undesirable growth from a field.

Another object of my invention is to provide a rod weeder drive which does not clog during operation due to dirt and/or weeds interfering with the drive mechanism.

Another object of my invention is to provide a self-cleaning drive mechanism which does not employ complex, moving parts.

These and other objects of the present invention will become apparent to those skilled in the art from a study of the drawings, the written disclosure, and the appended claims.

These and other objects are accomplished by means of a preferred specific construction and arrangement of parts that now will be described in detail for which purpose reference will be had to the accompanying drawings where invention has been illustrated and in which:

FIG. 4 is a partially broken side elevational view illustrating the rod weeder drive, and drive housing attached to a tooth member of said spring tooth harrow;

FIG. 5 is a fragmentary rear elevational view of the rod weeder drive and drive housing of FIG. 4;

FIG. 6 is a fragmentary view illustrating the belt drive for the drive mechanism of FIGS. 4 and 5 and showing the plurality of apertures positioned on the side surfaces of the pulley wheel which serves as the self-cleaning mechanism to prevent dirt and/or weeds from clogging the drive mechanism;

Figure 1:
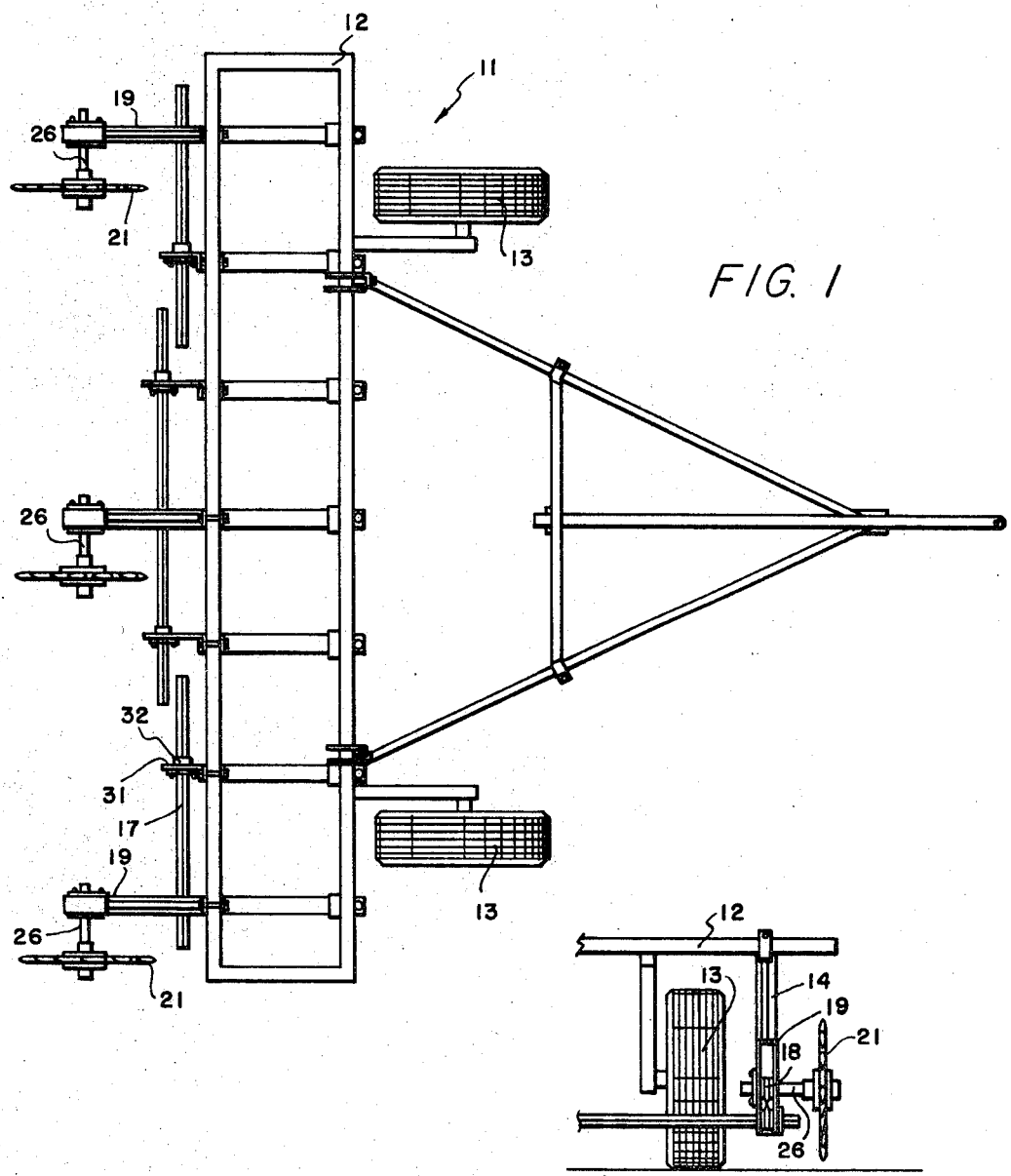
FIG. 1 is a plan view of a rod weeder attached to a spring tooth harrow and showing essential elements thereof.
Figure 2:
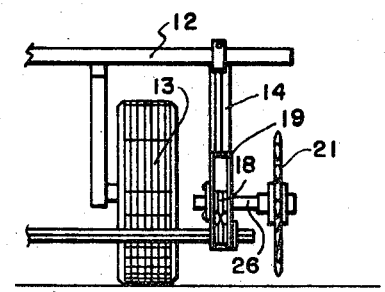
FIG. 2 is a fragmentary side elevational view of FIG. 1 showing relative position of elements with respect to the teeth members of said spring tooth harrow.
Figure 3:
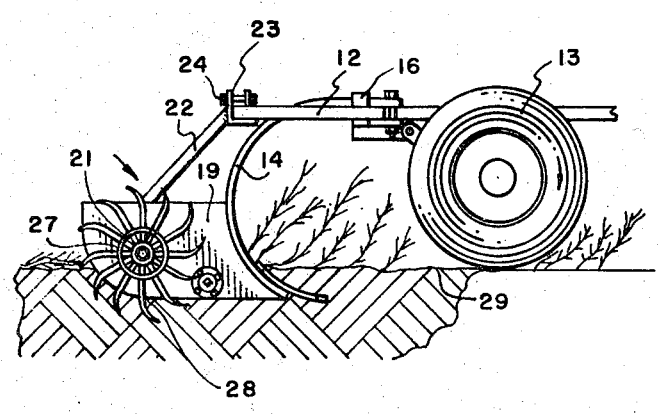
FIG. 3 is a view illustrating certain structural details of the assembly of FIGS. 1 and 2.

Referring now to the drawings wherein like elements will be designated by like numerals and particularly to FIGS. 1, 2 and 3, a rotary rod weeder apparatus is designated by numeral 11. Rotary rod weeder apparatus 11 comprises a frame 12 supported and carried by wheels 13, a plurality of aligned teeth members 14 connected to frame 12 by clamps 16, a rotary weeder rod 17, a drive means 18 positioned with drive-housing means 19, and ground-engaging wheels 21. Ground-engaging wheels 21 are operatively connected to drive means 18 within drive housing 19 which in turn is operatively connected to rotary weeder rod 17 so that as ground-engagement wheels 21 rotate, weeder rod 17 is caused to rotate in response thereto. Suitable results have been obtained where frame 12 and teeth members 14 are a spring tooth harrow. Drive housing-means 19 is connected to a portion of teeth members 14 on their lower rear side and can be seen in FIG. 2. Support element 22 is connected to drive-housing means 19 by any suitable means such as bolts, clamps, welding, etc. and to frame 12 by clamp 23 and bolt 24, or by any other suitable means.

Ground-engaging wheels 21 are operatively connected to axle members 26 which in turn are operatively connected to drive means 18 within drive-housing means 19. Ground-engaging wheels 21 are provided with rim 27 and a plurality of spikes 28 which are curved forward at their end furtherest removed from rim 27 as shown. As frame 12 moves forward across the field rotary weeder rod 17 is caused to travel just below the surface of ground or soil 29. As ground-engaging wheels 21 are caused to rotate in clockwise direction since the apparatus is viewed from the left as frame 12 moves forward to the right, as it is being towed or pulled along behind a tractor or the like, thus weeder rod 17 is caused to rotate in a counterclockwise direction due to drive means 18 which will be described in more detail later. Weeder rod 17 is maintained in a horizontal fixed position by a support member 31 which is connected to one of teeth member 14 at a point removed from drive-housing means 19. Support member 31 is provided with bearing 32 connected thereto and having a square-shaped opening therein so that weeder rod 17, extends therethrough. As can be seen in FIG. 1 desirable results have been employed wherein three rotary, square-shaped weeder rods are connected to a spring tooth harrow in the manner shown so that the center section of the horizontal weeder rod is offset with respect to the outer weeder rods thereby providing an overlapping effect between the weeder rods and preventing weeds from passing through a gap formed by the weeder rods.

Referring now to FIGS. 4—6 drive means 18 of the present invention will be more fully described. Drive means 18 is positioned within drive-housing means 19. Drive-housing means comprises side 33 and side 34 maintained in a spaced relationship by way of spacer 36. Drive-housing means 19 is connected to the lower rear portion of one of teeth members 14. Each of the sides 33 and 34 are provided with downwardly forwardly extending curvatures and are connected by cover plate 37. Sides 33 and 34 are provided with a first opening within the lower side portion of walls 33 and 34 and a second opening positioned within the rear portion of walls 33 and 34. A first pulley wheel 38, having a plurality of apertures 39 positioned therein, has bearing assembly 40 which in turn is provided with square shape center opening 41 is positioned within drive-housing means 19 by square-shaped rod 17. Weeder rod 17 is then secured to walls 33 and 34 and the openings therethrough by bearing assembly 40 thereby maintaining pulley wheel 38 and thus weeder rod 17 in a relatively fixed position but, at the same time, allowing rotation of the pulley wheel 38 and thus weeder rod 17. A second pulley wheel 43 is positioned on axle member 26 and second pulley wheel 43 is likewise provided with a plurality of apertures 44 positioned therein. The second pulley wheel 43 is positioned within the opening within drive-housing means 19 by way of opening in the upper rear portion of sides 33 and 34 and bearing assemblies 42 and 46 are connected to axle member 26 to maintain axle member 26 and second pulley wheel 43 in drive-housing means 19 in a relatively fixed position but, at the same time allowing the same to rotate. An endless belt 47 is trained over first and second pulley wheels 38 and 43, a portion of belt 47 being arranged in a crisscross relation as can be seen. A ground-working element 48, such as a ground-working chisel, is attached to the forward lower portion of tooth member 14 to facilitate movement of drive-housing means 19 and thus the drive mechanism and thus the weeder rod underneath the surface of the soil.

Ground-engaging wheels 21 are connected to axle member 26 by any suitable means such as lock nut 49.

In operation as ground-engaging wheels 21 are caused to move over the ground in a counterclockwise direction, they cause axle member 26 and thus second pulley wheel 43 to be rotated in counterclockwise direction. Upon the movement of second pulley wheel 43 the crisscross belt causes first pulley wheel 38 to be rotated in a clockwise direction thereby rotating the weeder rod in a clockwise direction. As can be seen in FIG. 4 the ground-working elements are provided with a downwardly sloping curvature similar to that of tooth member 14 and are provided with pointed ends 51 and 52 thereby allowing the ground-working element to be rotated so that when one end becomes dull due to the excessive wear the element can be merely turned upside down and the other end employed.

Apertures 39 and 44 of first and second pulley wheels 38 and 43 have been employed to effectively prevent clogging of drive means 18 due to dirt and/or weeds. The endless belt 47 rides on the sides of the pulleys 38 and 43 above the apertures 39 and 44, respectively, so that any dirt or the like on the belt 47 falls through the apertures 39 and 44 without buildup on the pulleys 38 and 43. Further, without the use of apertures 39 and 44 drive means 18 was clogged by dirt and weeds and thus cause frequent shutdowns of the unit in order to free the driving mechanism and thus allow rotation of the weeder rod. Therefore, it has been found that by employing a drive mechanism such as that shown and described hereinbefore effective means for preventing the clogging of drive means 18 can be effected without the necessity of complex moving parts which are subject to breakdown and thus costly repair.

Figure 7:
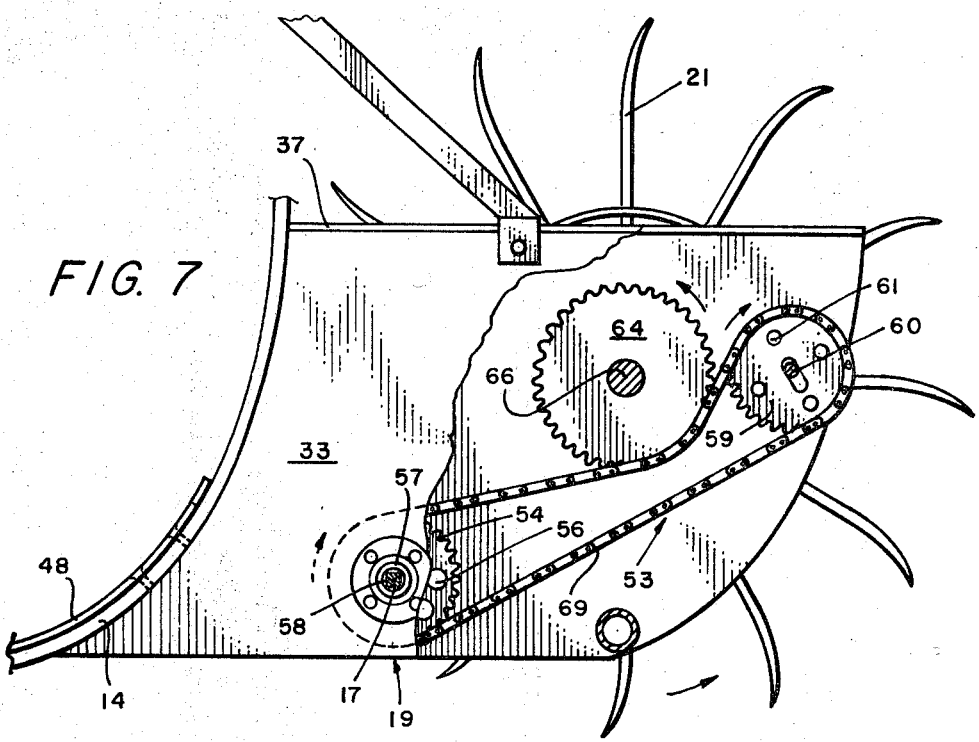
FIG. 7 is a partially broken side elevational view illustrating another embodiment of the rod weeder drive having three sprocket wheels positioned within a drive housing which is attached to a tooth member of said spring tooth harrow.
Figure 8:
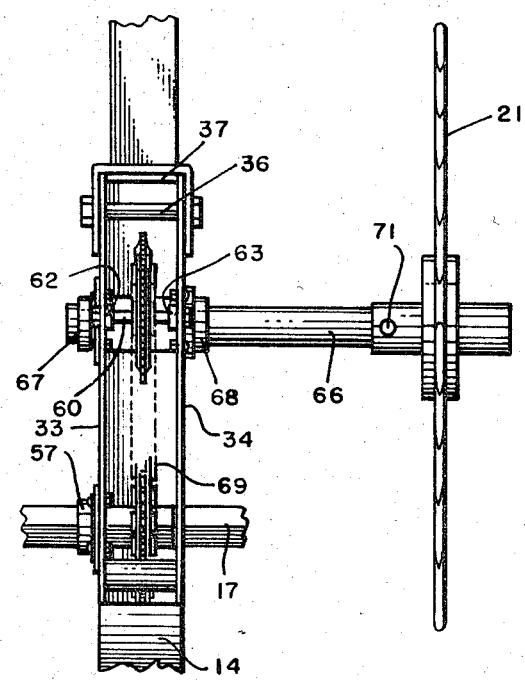
FIG. 8 is a fragmentary rear elevational view of the rod weeder drive and drive housing of FIG. 4.

Referring now to FIGS. 7 and 8 another preferred specific embodiment of a drive means, generally indicated by numeral 53, will be described in detail. Drive means 53 is positioned within drive-housing means 19. Drive-housing means 19 comprises side 33 and side 34 maintained in a spaced relationship by way of spacer 36. Drive-housing means 19 is connected to the lower rear portion of one of teeth members 14. Each of the sides 33 and 34 are provided with downwardly forwardly extending curvatures and are connected by cover plate 37. Sides 33 and 34 are provided with a first opening within the lower forward portion of walls 33 and 34 and a second opening positioned within the rear portion of walls 33 and 34. A third opening is likewise provided within sidewalls 33 and 34 and the third opening is positioned intermediate said first and second opening. A first sprocket wheel 54 having a plurality of apertures positioned therein, has bearing assembly 57 which in turn is provided with square shape center opening 58 is positioned within drive-housing means 18 by square-shaped rod 17. Weeder rod 17 is then secured to walls 33 and 34 and said first opening therethrough by bearing assembly 57 thereby maintaining first sprocket wheel 54 and thus weeder rod 17 in a relatively fixed position, but at the same time, allowing rotation of first sprocket wheel 54 and thus weeder rod 17. A second sprocket wheel 59 is positioned on axle member 60 and second sprocket wheel 59 is likewise provided with a plurality of apertures 61 positioned therein. The second sprocket wheel 59 is positioned within said second opening within the upper rear portion of sides 33 and 34 of drive-housing means 19. Bearing assemblies 62 and 63 are connected to axle member 60 to maintain axle member 60 and second sprocket wheel 59 in drive-housing means 19 in a relatively fixed position, but at the same time allowing the same to rotate. A third sprocket wheel 64 is mounted on axle member 66 of ground-engaging wheel 21 and positioned within said third opening provided intermediate said first and second openings in the sides 33 and 34 of drive-housing means 19. Bearing assemblies 67, and 68 are connected to axle member 66 of ground-engaging wheel 21 to maintain axle member 66 and thus third sprocket wheel 64 in drive-housing means 19 in a relatively fixed position, but at the same time allowing third sprocket wheel 64 to rotate in response of movement of said ground-engaging wheel. An endless chain member 69 is trained over first and second sprocket wheels 54 and 59 and chain member 69 is positioned under third sprocket wheel 64 as shown in FIG. 7. A ground-working element 48, such as a ground-working chisel, is attached to the forward lower portion of tooth member 14 to facilitate movement of drive-housing means 19 and thus the drive mechanism and thus the weeder rod underneath the surface of the soil.

Ground-engaging wheels 21 are connected to axle member 66 by any suitable means such as lock nut 71.

In operation as ground-engaging wheels 21 are caused to move over the ground in a counterclockwise direction, they cause axle member 66 and thus third sprocket wheel 64 to be rotated in counterclockwise direction. Upon third sprocket pulley wheel 64 contacting the upper surface of chain member 69 and the movement of third sprocket wheel 64 and thus chain member 69 second sprocket wheel 59 and thus first sprocket wheel 54 are likewise rotated in a clockwise direction thus rotating the weeder rod in a clockwise direction. As can be seen in FIG. 7, the ground-working elements are provided with a downwardly sloping curvature similar to that of tooth member 14 and are provided with pointed ends thereby allowing the ground-working element to be rotated so that when one end becomes dull due to the excessive wear the element can be merely turned upside down and the other end employed.

Apertures 56 and 61 of first and second sprocket wheels 54 and 59 have been employed to effectively prevent clogging of drive means 53 due to dirt and/or weeds. Further, without the use of apertures 56 and 61 drive means 53 was clogged by dirt and weeds and thus cause frequent shutdowns of the unit in order to free the driving mechanism and thus allow rotation of the weeder rod. Therefore, it has been found that by employing a drive mechanism such as that shown and described hereinbefore effective means for preventing the clogging of drive means 53 can be affected without the necessity of complex-moving parts which are subject to breakdown and thus costly repair.

The novel rod weeder of the present invention is unique, also, as to both the reverse V-belt drive mechanism and the endless chain drive mechanism, in that both of the drive mechanisms receive their driving power from the ground-engaging wheels of the implement which are operatively connected to the drive mechanism and thus to the weeder rod. Thus, upon lifting the apparatus of the present invention from a ground-engaging position the drive power supplied to the drive mechanism and thus the rod weeder is disengaged.

The foregoing discussion and description has been made in connection with preferred specific embodiments of the rod weeder of the invention. However, it is to be understood that the discussion and description is only intended to illustrate and teach those skilled in the art how to practice the invention, and such is not to unduly limit the scope of the invention which is as defined in the claims set forth hereinafter.

I claim:

1. An apparatus for removing undesirable growth from the ground comprising in combination:
   a. a frame carried by wheels;
   b. an earth-working means connected to said frame, said earth-working means including a plurality of harrow teeth members;
   c. a drive-housing means connected to the lower rear portion of one of said teeth members and having sides positioned in substantially parallel relation and extending downward and forwardly, and an upper plate connected to the upper portion of said sides, a first opening positioned within the lower forward portion of said sides and a second opening positioned within the rear portion of said sides;
   d. a support-housing means connected to the lower portion of another of said teeth members at a point removed from said drive-housing means;
   e. a weeder rod positioned so that one end is operatively connected to said housing means and the other end is operatively connected to said drive-housing means;
   f. a drive means operatively connected to the end of said weeder rod through said drive-housing means thereby causing said weeder rod to be rotated in a direction opposite the rotational operating direction of said drive means therefor, said drive means and said weeder rod being constructed and connected so that upon raising said apparatus from a ground-engaging position said drive means is disengaged;
   g. said drive means including a wheel means mounted on support means connected to said frame and having spikes to firmly grasp the supporting ground during earth-working operations;
   h. said drive means including first and second pulley wheels interconnected by a pulley belt in crisscross relation, said first pulley wheel connected to said weeder rod to turn same in operation, said second pulley wheel connected to said wheel means to turn therewith in operation, and said first and second pulley wheels provided with self-cleansing means having a plurality of spaced apertures in sidewalls of said first and second pulley wheels thereby providing a self-cleaning operation of said first and second pulley wheels;
   i. said weeder rod extending through said first pulley wheel and said first opening of said sides of said drive-housing means with said weeder rod having one end extended beyond said drive housing;
   j. said support-housing means having a first bearing assembly adapted to support the extended portion of said weeder rod;
   k. said drive means further including a second bearing assembly connected to said weeder rod to maintain said weeder rod in said first opening and said first pulley wheel within said drive housing, said second bearing assembly cooperating with said first bearing assembly thereby allowing said weeder rod to rotate;
   l. an axle member;
   m. said second pulley wheel position on said axle member;
   n. a third bearing assembly connected to said axle member to maintain said axle member in said second opening in said drive-housing means and said second pulley wheel in said housing, said third bearing assembly being adapted to allow said axle member and said second pulley wheel to rotate;
   o. said wheel means having said spikes positioned upon and connected to one end of said axle member thereby in operation causing said axle member and thus said second pulley wheel to rotate thus moving said crisscross belt, thus causing said first pulley wheel, and thus said weeder rod to be rotated; and
   p. a knife member attached to the lower forward portion of one of said teeth members having said drive-housing connected thereto, said knife member having a pointed tip on both of its ends and having a downward forwardly extending curvature similar to said teeth members.

2. An apparatus for removing undesirable growth from the ground comprising in combination:
   a. a frame carried by wheels;
   b. an earth-working means connected to said frame, said earth-working means including a plurality of harrow teeth members;
   c. a drive-housing means connected to the lower rear portion on one of said teeth members and having sides positioned in substantially parallel relation and extending downward and forwardly, and an upper plate connected to the upper portion of said sides, a first opening positioned within the lower forward portion of said sides, a second opening positioned within the rear portion of said sides, and a third opening positioned intermediate said first and second openings;
   d. a support-housing means connected to the lower portion of another of said teeth members at a point removed from said drive-housing means;
   e. a weeder rod positioned so that one end is operatively connected to said housing means and the other end is operatively connected to said drive-housing means;
   f. a drive means operatively connected to the end of said weeder rod through said drive-housing means thereby causing said weeder rod to be rotated in a direction opposite the rotational operating direction of said drive means therefor, said drive means and said weeder rod being constructed and connected so that upon raising said apparatus from a ground-engaging position said drive means is disengaged;
   g. said drive means including a wheel means mounted on support means connected to said frame and having spikes to firmly grasp the supporting ground during earth-working operations;
   h. said drive means including a first sprocket wheel having a plurality of apertures therein and mounted on said weeder rod, said weeder rod extending through said first opening in said sides of said drive housing means and extending therebeyond;
   i. said support-housing means having a first bearing assembly positioned therein and adapted to support the extended portion of said weeder rod;
   j. said drive means including a second bearing assembly connected to said weeder rod to maintain same in said first opening and said first sprocket wheel within said housing, said second bearing assembly cooperating with said first bearing assembly thereby allowing said weeder rod to rotate;
   k. an axle member;
   l. a second sprocket wheel positioned on said axle member, said second sprocket wheel having a plurality of apertures therein;
   m. a third bearing assembly connected to said axle member to maintain same in said second opening and said second sprocket wheel in said housing, said third bearing assembly being adapted to allow said axle and thus said second sprocket wheel to rotate;
   n. a second axle member;
   o. a third sprocket wheel position on said second axle member;
   p. a fourth bearing assembly connected to said second axle member to maintain same in said third opening and said third sprocket wheel in said housing, said fourth bearing assembly being adapted to allow said second axle and thus said third sprocket wheel to rotate;
   q. an endless chain trained over said first and second sprocket wheels and positioned underneath and in engagement with said third sprocket wheel; and
   r. said drive means being positioned upon and connected to one end portion of said second axle member thereby in operation causing said second axle member and thus said third sprocket wheel to rotate, thus moving said endless chain, thus causing said first and second sprocket wheels and thus said weeder rod to be rotated.